(12) United States Patent
Ciuperca

(10) Patent No.: US 12,291,488 B2
(45) Date of Patent: May 6, 2025

(54) LIME AND HYDRAULIC CEMENT MANUFACTURE USING, HYALOCLASTITE OR LAVA, AND METHOD OF MAKING AND USING SAME

(71) Applicant: Greencraft LLC, Norcross, GA (US)

(72) Inventor: Romeo Ilarian Ciuperca, Atlanta, GA (US)

(*) Notice: Subject to any disclaimer, the term of this patent is extended or adjusted under 35 U.S.C. 154(b) by 0 days.

(21) Appl. No.: 18/765,282

(22) Filed: Jul. 7, 2024

(65) Prior Publication Data
US 2025/0011232 A1    Jan. 9, 2025

Related U.S. Application Data

(60) Provisional application No. 63/512,657, filed on Jul. 9, 2023.

(51) Int. Cl.
*C04B 7/42* (2006.01)
*C04B 7/32* (2006.01)
*C04B 7/43* (2006.01)

(52) U.S. Cl.
CPC ................ *C04B 7/425* (2013.01); *C04B 7/32* (2013.01); *C04B 7/427* (2013.01); *C04B 7/43* (2013.01)

(58) Field of Classification Search
CPC .......... C04B 7/425; C04B 7/32; C04B 7/427; C04B 7/43
See application file for complete search history.

(56) References Cited

U.S. PATENT DOCUMENTS

| | | | |
|---|---|---|---|
| 9,822,037 B1* | 11/2017 | Ciuperca | C04B 14/14 |
| 10,065,886 B1* | 9/2018 | Ciuperca | C04B 28/04 |
| 10,633,284 B2* | 4/2020 | Ciuperca | C04B 28/04 |
| 11,242,286 B2* | 2/2022 | Ciuperca | B28C 7/02 |
| 11,858,847 B2* | 1/2024 | Ciuperca | C04B 7/12 |
| 2021/0070656 A1 | 3/2021 | Finke et al. | |

\* cited by examiner

*Primary Examiner* — Anthony J Green
(74) *Attorney, Agent, or Firm* — Robert E. Richards

(57) ABSTRACT

The invention comprises a method of making lime, dolomitic lime, hydraulic cement such as portland cement clinker and co-products such as pozzolan, acids, alumina, silica and the like while producing reduced amounts of carbon dioxide. The method comprises combining hyaloclastite with a first acid to form a first salt, combining the first salt with a second acid to form a second salt and heating the second salt to form an oxide.

19 Claims, No Drawings

LIME AND HYDRAULIC CEMENT MANUFACTURE USING, HYALOCLASTITE OR LAVA, AND METHOD OF MAKING AND USING SAME

CROSS-REFERENCE TO RELATED APPLICATIONS

The present application claims the benefit of application Ser. No. 63/512,657 filed Jul. 9, 2023.

FIELD OF THE INVENTION

The present invention generally relates to manufacturing lime, such as quick lime or dolomitic lime, and a hydraulic cement as well as a different type of improved pozzolan and various coproducts. Significantly, the present invention can be used to reduce carbon emissions in the production of lime or hydraulic cement.

BACKGROUND OF THE INVENTION

Modern concrete is composed of one or more hydraulic cements, coarse aggregates, and fine aggregates. Optionally, modern concrete can include other cementitious materials, inert fillers, property modifying admixtures and coloring agents. The hydraulic cement is typically portland cement. However other types of hydraulic cements can be made by using a small amount of lime to activate a reactive cementitious material such as a pozzolan. In the case of a lime activated concrete or mortar, the overall $CO_2$ emissions will be reduced; however, there will still be a significant amount of $CO_2$ emission associated with the current lime manufacturing process.

Lime manufacturing is the process of calcining limestone, which is $CaCO_3$ where at high temperatures the $CO_2$ is released from the limestone thereby creating lime which is CaO. The lime manufacturing process generates significant amount of $CO_2$, in some cases up to 800 kg of $CO_2$ per ton of lime. In the case of dolomitic lime, the $CO_2$ emissions can be as high 900 kg per ton of dolomitic lime cement. Most of the $CO_2$ is released during the calcining process where the limestone (calcium carbonate or calcium magnesium carbonate) calcining process releases $CO_2$ to create lime or dolomitic lime.

The lime manufacturing industry has been under pressure to reduce the amount of $CO_2$ emissions per ton of lime produced. However, there is no other current practical process employed to produce lime, such as quick lime or hydrated lime or dolomitic lime, other than by calcination of a carbonated mineral such as limestone or dolomite.

The manufacture of lime generates significant amounts of $CO_2$. By some estimates as much as 10-12% of global $CO_2$ emission can be traced to the manufacture of lime. As a result, great emphasis is being placed on the reduction of $CO_2$ from lime manufacture, such as carbon capture and carbon sequestration. Yet, the lime manufacturing process in current use is hardly unchanged from the initial process of grinding and calcining limestone and dolomite. The present invention addresses this process by manufacturing lime from a non-carbonated mineral using an acid dissolution process that results in a lime or dolomitic lime that can be used in any current application that lime or dolomite is used. Lime manufactured by this process can also be used as a hydraulic cement in combination with a pozzolan to create concrete or mortars. In addition, the lime manufacturing process in accordance with the present invention will result in the manufacture of an improved pozzolan as the byproduct of the lime manufacture process.

Portland cement is the most commonly used hydraulic cement in use around the world today. Portland cement typically is made from limestone. Concrete or mortar made with portland cement sets relatively quickly and gains relatively high compressive strength in a relatively short time. Although significant improvements have been made to the process and efficiency of portland cement manufacturing, it is still a relatively expensive and highly polluting industrial process. The cement manufacture process generates significant amount of $CO_2$, in some cases up to 800 kg per ton of portland cement. Most of the $CO_2$ is released during clinker manufacture where the limestone (calcium carbonate) calcination process releases $CO_2$ to create clinker.

The manufacture of portland cement generates significant amounts of $CO_2$. By some estimates as much as 7% of global $CO_2$ emission can be traced to the manufacture of portland cement. As a result, great emphasis is being placed on the reduction of $CO_2$ from portland cement manufacture, such as carbon capture and carbon sequestration. Yet, the portland clinker manufacturing process in current use is hardly unchanged from the initial process of grinding limestone, clay, iron ore and silica. The present invention addresses this process by improving the efficiency of the manufacturing process and reducing emissions, the carbon foot print and increasing productivity whereby the calcium oxide used to produce lime or hydraulic cement is supplied from a calcium-iron-aluminosilicate instead of limestone.

SUMMARY OF THE INVENTION

The present invention satisfies the foregoing needs by providing a lime or dolomite manufacturing process using a non-carbonated mineral containing calcium, in a non-carbonated matrix and or magnesium, for the manufacture of lime or dolomitic lime as well as alumina silica and iron necessary to manufacture a pozzolan that can then be recombined with the lime to create a hydraulic cement to be used in concrete or mortars. The present invention also satisfies the foregoing needs by providing a hydraulic cement manufacturing process such as portland cement to be used in concrete or mortars, whereby the calcium oxide needed in the manufacture of the hydraulic cement is supplied using a non-carbonated mineral containing calcium, in a non-carbonated matrix and or magnesium.

We refer to this mineral herein as calcium-iron-aluminosilicate mineral that contains un-carbonated Ca and Mg (usually in the form of CaO and MgO) in an amorphous or crystalline matrix or a combination thereof. Along with Ca and Mg these minerals contain Al, Si and Fe, combined in an amorphous or crystalline form or a combination thereof, also combined with other elements in minor amount. When the calcium-iron-aluminosilicate mineral is mixed with a first acid, such as hydrochloric acid, the calcium will be leached out of the calcium-iron-aluminosilicate to form a first salt such as calcium chlorite and an iron-aluminosilicate such as an aluminosilicate pozzolan with a relatively high concentration of iron. The first salt, such as the calcium chlorite, is then farther reacted with a second acid, such a sulfuric acid, to form a second salt, such as a calcium sulfate. The second salt such as the calcium sulfate is then heated whereby the sulfur is releases as sulfur oxide and the calcium oxide or calcium hydroxide is obtained. The calcium oxide, which is quick lime, or the calcium hydroxide, which is hydrated lime, can then be used in any current application that lime or hydrated lime is used. The sulfur oxide can be captured and combined with water to create the sulfuric or sulfurous acid that can be re-used as the second acid in the step above to create the second salt. Similarly, a dolomitic lime can be obtained by the same acid dissolution process. In either case once the calcium and or magnesium is dissolved out of the non-carbonated calcium-iron-aluminosilicate mineral a new iron-aluminosilicate mineral will be produced whereby such mineral can be used as a pozzolan. Such pozzolan can be used in the manufacture of concrete or mortars either by combining it with the any of the lime produced by the method above or by combining it with any other hydraulic cement such as slag cement, ordinary portland cement, or any other compound having an active hydroxyl group such as potassium hydroxide, sodium hydroxide and the like to create a cement that can be used in concrete or mortars. The un-carbonated Ca found in the calcium-iron-aluminosilicate mineral does not contributes any $CO_2$ emissions to the manufacture of the lime or the calcium oxide needed in the manufacturing process of hydraulic cement in accordance with this invention. In other words, the amount of Ca or CaO contained in the calcium-iron-aluminosilicate mineral replaces the CaO that would normally be provided from limestone calcination thereby eliminating the amount of $CO_2$ that would normally be generated by limestone calcination either in the lime or hydraulic cement manufacturing process. Typically, a calcium-iron-aluminosilicate mineral contains approximately 4% to approximately 25% CaO which means that a lime or dolomitic lime made using the mineral of the present invention as a replacement for the limestone in the lime manufacturing process will eliminate the $CO_2$ emissions from the limestone calcination process in its entirety.

In another disclosed embodiment, the present invention comprises a lime manufacturing process using a natural calcium-iron-aluminosilicate mineral within the chemical composition preferably comprises approximately 30 to approximately 57 percent by weight $SiO_2$, approximately 10 to approximately 18 percent by weight $Al_2O_3$, approximately 5 to approximately 18 percent by weight $Fe_2O_3$, and approximately 4 to approximately 25 percent by weight CaO and preferably wherein the sum of the $Al_2O_3+Fe_2O_3$ is between approximately 20 to approximately percent by weight, preferably wherein the ratio between the $Al_2O_3$ and the $Fe_2O_3$ is approximately 0.75 and approximately 1.50 ideally or approximately 1 and the ratio between the $SiO_2$ and the sum of the $Al_2O_3+Fe_2O_3$ is preferably between approximately 1.25 and 2.25, ideally approximately 1.5.

In a further disclosed embodiment, the present invention comprises a hydraulic cement manufacturing process using a natural calcium-iron-aluminosilicate mineral within the chemical composition preferably comprises approximately 30 to approximately 57 percent by weight $SiO_2$, approximately 10 to approximately 18 percent by weight $Al_2O_3$, approximately 5 to approximately 18 percent by weight $Fe_2O_3$, and approximately 4 to approximately 25 percent by weight CaO and preferably wherein the sum of the $Al_2O_3+Fe_2O_3$ is between approximately 20 to approximately 35 percent by weight, preferably wherein the ratio between the $Al_2O_3$ and the $Fe_2O_3$ is approximately 0.75 and approximately 1.50 ideally or approximately 1 and the ratio between the $SiO_2$ and the sum of the $Al_2O_3+Fe_2O_3$ is preferably between approximately 1.25 and 2.25, ideally approximately 1.5, to produce lime that is further combined with iron, alumina and silica either resulting from the same manufacturing process as the lime or from separate minerals or from the same calcium-iron-aluminosilicate mineral used to produce lime and calcining the combined lime, iron, alumina and silica at a temperature sufficiently high to sinter these elements to produce a hydraulic cement.

In another disclosed embodiment, the present invention comprises a calcium-iron-aluminosilicate mineral from one or more of hyaloclastite, lava, gabbro, volcanic ash, scoria, pumice or any igneous or sedimentary mineral with a basaltic or intermediate basaltic chemistry which is then processed to elemental oxide forms, which can then be used to produce lime, a hydraulic cement or other products.

In another disclosed embodiment, the invention comprises combining hyaloclastite with a first acid to form a first salt, combining the first salt with a second acid to form a second salt, and heating the second salt to form an oxide.

In another disclosed embodiment, the invention comprises combining hyaloclastite with a first acid to form a first salt and heating the first salt to form an oxide.

In another disclosed embodiment, the invention comprises combining a calcium-iron-aluminosilicate mineral with a first acid to form a first salt, combining the first salt with a second acid to form a second salt, and heating the second salt to form an oxide.

In another disclosed embodiment, the invention comprises combining a calcium-iron-aluminosilicate mineral with a first acid to form a first salt and heating the first salt to form an oxide.

Accordingly, it is an object of the present invention to provide an improved lime or dolomitic lime manufacturing process that significantly reduces or eliminates $CO_2$ emissions.

Another object of the present invention is to provide an improved lime or dolomitic lime manufacturing process that uses less energy when compared with current practices.

Accordingly, it is an object of the present invention to provide an improved hydraulic cement manufacturing process that significantly reduces or eliminates $CO_2$ emissions.

Another object of the present invention is to provide an improved hydraulic cement manufacturing process that uses less energy when compared with current practices.

Another object of the present invention is to provide an iron-aluminosilicate or an aluminosilicate pozzolan manufacturing process that requires a reduced amount of energy and time thereby reducing overall emissions when compared with current practice.

A further object of this invention is to combine the lime produced in accordance with the present invention with the iron-aluminosilicate or aluminosilicate mineral pozzolan produced in accordance with the present invention to create a concrete or mortar.

Yet another object of this invention is to combine the lime produced in accordance with the present invention with the iron-aluminosilicate or aluminosilicate mineral pozzolan produced in accordance with the present invention and aggregate and water to create a concrete or mortar.

A further object of the present invention is to combine the hydraulic cement produced in accordance with the present invention with aggregate and water to create a concrete or mortar.

Another object of this invention is to combine the iron-aluminosilicate or aluminosilicate mineral pozzolan produced in accordance with the present invention with a hydraulic cement, such as slag cement, ordinary portland cement or the like and aggregate and water to create a concrete or mortar.

Yet another object of this invention is to combine the iron-aluminosilicate or aluminosilicate mineral pozzolan produced in accordance with the present invention with a compound having an active hydroxyl group, such as sodium hydroxide, potassium hydroxide and the like to create a concrete or mortar.

These and other objects, features and advantages of the present invention will become apparent after a review of the following detailed description of the disclosed embodiments and the appended claims.

DETAILED DESCRIPTION OF THE DISCLOSED EMBODIMENTS

Hyaloclastite is a hydrated tuff-like breccia typically rich in black volcanic glass, formed during volcanic eruptions under water, under ice or where subaerial flows reach the sea or other bodies of water. It has the appearance of angular fragments sized from approximately a millimeter to a few centimeters. Larger fragments can be found up to the size of pillow lava as well. Several minerals are found in hyaloclastite masses including, but not limited to, sideromelane, tachylite, palagonite, olivine, pyroxene, magnetite, quartz, hornblende, biotite, hypersthene, feldspathoids, plagioclase, calcite and others. Fragmentation can occur by both an explosive eruption process or by an essentially nonexplosive process associated with the spalling of pillow basalt rinds by thermal shock or chill shattering of molten lava. The water-quenched basalt glass is called sideromelane, a pure variety of glass that is transparent, and lacks the very small iron-oxide crystals found in the more common opaque variety of basalt glass called tachylite. In hyaloclastite, these glassy fragments are typically surrounded by a matrix of yellow-to-brown palagonite, a wax-like substance that forms from the hydration and alteration of the sideromelane and other minerals. Depending on the type of lava, the rate of cooling and the amount of lava fragmentation, the particle of the volcanic glass (sideromelane) can be mixed with other volcanic rocks or crystalline minerals, such as olivine, pyroxene, magnetite, quartz, plagioclase, calcite and others.

Hyaloclastite is usually found within or adjacent subglacial volcanoes, such as tuyas, which is a type of distinctive, flat-topped, steep-sided volcano formed when lava erupts under or through a thick glacier or ice sheet. Hyaloclastite ridges are also called tindars and subglacial mounds are called tuyas or mobergs. They have been formed by subglacial volcanic eruptions during the last glacial period. A subglacial mound is a type of subglacial volcano. This type of volcano forms when lava erupts beneath a thick glacier or ice sheet. The magma forming these volcanoes was not hot enough to melt a vertical pipe through the overlying glacial ice, instead forming hyaloclastite and pillow lava deep beneath the glacial ice field. Once the glacier retreated, the subglacial volcano was revealed, with a unique shape as a result of its confinement within the glacial ice. Subglacial volcanoes are somewhat rare worldwide, being confined to regions that were formerly covered by continental ice sheets and also had active volcanism during the same period. Currently, volcanic eruptions under existing glaciers may create hyaloclastite as well. Hyaloclastite tuff-like breccia is a pyroclastic rock comprised of glassy juvenile clasts contained in a fine-grained matrix dominated by glassy shards. Hyaloclastite breccias are typically products of phreatomagmatic eruptions in particular associated with the eruption of magmas into bodies of water and form by fragmentation of chilled magma. They are often formed from basaltic magmas and are associated with pillow lavas and sheet flows. In addition, any other type of lava, such as intermediate, andesitic, dacitic and rhyolitic, can form hyaloclastite under similar rapid cooling or quenching conditions.

Sometimes a subglacial or subaquatic eruption may produce a release of volcanic ashes that are ejected into the atmosphere which can then land back on the ground. At times a fine volcanic particle size may be called a "volcanic ash" by different professionals in the geological field even though the ash definition may be debatable. It is also possible that a subglacial or subaquatic eruption may have been produced by a magma with high volume of gas entrapped in the lava. The high volume of gas exsolution may create a mineral with very high porosity or vesicular structure and bulk density similar to scoria or pumice.

Volcanic or metamorphic calcium-iron-aluminosilicate minerals, such as hyaloclastite, lava, scoria, volcanic ash, or pumice, can be classified based on the amount of silica content as: basaltic (less than 53% by weight $SiO_2$), intermediate (approximately 53-57% by weight $SiO_2$), or silicic such as andesitic (approximately 57-63% by weight $SiO_2$), dacitic (approximately 63-69% by weight $SiO_2$), or rhyolitic (greater than 69% by weight $SiO_2$). However, for the purpose of this invention the basaltic range starts at 40% $SiO_2$ and the andesitic range ends at 65% $SiO_2$.

Basaltic hyaloclastite, lava, scoria, volcanic ash or pumice contains generally 40% to 53% by weight silica ($SiO_2$) contained in an amorphous or crystalline form or a combination thereof essentially calcic plagioclase feldspar and pyroxene (usually Augite), with or without olivine. In addition to silica, basaltic hyaloclastite, volcanic ash or pumice generally comprises approximately 10 to approximately 18 percent by weight $Fe_2O_3$, approximately 6 to approximately 18 percent by weight CaO, approximately 5 to approximately 15 percent by weight MgO and other elements in various percentages. Intermediate basaltic hyaloclastite, volcanic ash or pumice generally comprises approximately 53 to approximately 57 percent by weight silica ($SiO_2$) content. In addition to silica, intermediate basaltic hyaloclastite, volcanic ash or pumice generally comprises approximately 5 to approximately 10 percent by weight $Fe_2O_3$, approximately 6 to approximately 10 percent by weight CaO, approximately 3 to approximately 10 percent by weight MgO and other elements in various percentages. Basaltic hyaloclastite, volcanic ash or pumice may also contain quartz, hornblende, biotite, hypersthene (an orthopyroxene) and feldspathoids. The average specific density of basaltic hyaloclastite, volcanic ash or pumice is approximately 2.7-3.0 $gm/cm^3$.

Andesite is an abundant igneous (volcanic) rock of intermediate composition, with aphanitic to porphyritic texture. In a general sense, it is an intermediate type between basalt and dacite. Andesitic hyaloclastite, volcanic ash or pumice ranges from approximately 57 to approximately 63 percent by weight silicon dioxide ($SiO_2$). For the purpose of this invention, we extend the andesite $SiO_2$ content up to 65%. In addition to silica, andesitic hyaloclastite, volcanic ash or pumice generally comprises approximately 5 to approximately 10 percent by weight $Fe_2O_3$, approximately 5 to approximately 10 percent by weight CaO, approximately 3 to approximately 8 percent by weight MgO and other elements in various percentages.

Dacite is an igneous, volcanic rock with an aphanitic to porphyritic texture and is intermediate in composition between andesite and rhyolite and ranges from approximately 63% to approximately 69% by weight silicon dioxide ($SiO_2$). In addition to silica, dacite generally contains approximately 4 to approximately 8% by weight $Fe_2O_3$, approximately 3 to approximately 8% by weight CaO, approximately 1 to approximately 6% by weight MgO and other elements in various percentages. It consists mostly of plagioclase feldspar with biotite, homblende, and pyroxene (augite and/or enstatite). It has quartz as rounded, corroded phenocrysts, or as an element of the ground-mass. The plagioclase ranges from oligoclase to andesine and labradorite. Sanidine occurs, although in small proportions, in some dacites, and when abundant gives rise to rocks that form transitions to the rhyolites. The groundmass of these rocks is composed of plagioclase and quartz.

Rhyolite is an igneous (volcanic) rock of felsic (silica-rich) composition, typically greater than 69% by weight $SiO_2$. In addition to silica, rhyolite generally contains 0 to approximately 5% by weight $Fe_2O_3$, approximately 0.5 to approximately 6% by weight CaO, 0 to approximately 2% by weight MgO and other elements in various percentages. It may have a texture from glassy to aphanitic to porphyritic. The mineral assemblage is usually quartz, sanidine and plagioclase. Biotite and homblende are common accessory minerals.

The different types of calcium-iron-aluminosilicates minerals contain varying amounts of uncarbonated elements; i.e., Ca, Mg, K, Na and Fe, that are available to be leached out from the calcium-iron-aluminosilicate. as part of the manufacturing process in accordance with the present invention. As an example, the calcium-iron-aluminosilicate mineral, such as hyaloclastite, lava, gabbro, scoria, volcanic ash or pumice classified based on the amount of silica content comprises the following elements: basaltic hyaloclastite, volcanic ash or pumice (less than approximately 53% by weight $SiO_2$) contains CaO of approximately 6 to approximately 18% by weight, MgO approximately 5 to approximately 15% by weight, $K_2O$ approximately 1% by weight, $Na_2O$ approximately 3% by weight and $Fe_2O_3$ approximately 10 to approximately 18% by weight; intermediate hyaloclastite, volcanic ash or pumice (approximately. 53 to approximately 57% by weight $SiO_2$) comprises CaO of approximately 6 to approximately 10% by weight, MgO approximately 3 to approximately 10% by weight, $K_2O$ approximately 1% by weight, $Na_2O$ approximately 3% by weight and $Fe_2O_3$ approximately 5 to approximately 10% by weight;

As used herein, the term "calcium-iron-aluminosilicate mineral" means hyaloclastite, lava, gabbro, volcanic ash, scoria, pumice from any and all sources; i.e., all irrespective of the mineral source from which it is derived, either igneous or metamorphic, unless otherwise designated, with an amorphous content of 5-95% and a crystalline content of 5-95% wherein the crystalline matrix is comprised of micro-crystals.

Basaltic or mafic calcium-iron-aluminosilicate such hyaloclastite, volcanic ash, or pumice generally has approximately 6 to approximately 18% by weight uncarbonated calcium found with the amorphous matrix or a combination of amorphous and micro crystalline matrix. As the amount of $SiO_2$ increases from the low of 40% by weight for basaltic hyaloclastite, volcanic ash, scoria or pumice to the andesitic and dacitic silica range, the uncarbonated calcium, magnesium, iron decreases to where in the rhyolitic range there is virtually no uncarbonated calcium available. Therefore, the dacitic and rhyolitic mineral chemistries are not desirable minerals to be used in manufacture of lime or hydraulic cement in accordance with the present invention.

Tables 1-2 below show chemical oxides analysis of calcium-iron-aluminosilicate minerals, such as hyaloclastite, volcanic ash, or pumice-based minerals, from various sources and shows CaO and MgO levels as well as the $Fe_2O_3$ and $Al_2O_3$, correlated with the $SiO_2$ content. The values of the Ca, Mg, Fe, Na and K oxides shown in Table 1 below are examples of desirable calcium levels for lime and hydraulic cement production in accordance with the present invention.

TABLE 1

Desirable chemical compositions of calcium-iron-aluminosilicate minerals suitable for lime and hydraulic cement production

| Elements | LS36-10 | TDR | SND | AB | BKP | PVT | RDF | THR | VCR | PTR |
|---|---|---|---|---|---|---|---|---|---|---|
| $SiO_2$ | 45.20 | 45.00 | 47.70 | 47.20 | 46.36 | 48.50 | 50.60 | 52.85 | 54.94 | 60.39 |
| $Al_2O_3$ | 14.09 | 17.60 | 15.33 | 12.49 | 11.96 | 15.40 | 15.00 | 14.53 | 14.87 | 13.05 |
| Total $SiO_2$, $Al_2O_3$ | 59.29 | 62.60 | 63.03 | 59.69 | 58.32 | 63.90 | 65.60 | 67.38 | 69.81 | 73.44 |
| CaO | 14.77 | 12.70 | 11.51 | 11.51 | 9.68 | 9.37 | 9.16 | 8.94 | 8.84 | 6.69 |
| MgO | 6.11 | 7.27 | 10.89 | 11.06 | 5.50 | 6.57 | 7.78 | 4.94 | 4.93 | 6.37 |
| FeO | 13.07 | 12.90 | 12.75 | 12.04 | 15.38 | 13.00 | 10.20 | 12.03 | 9.85 | 7.21 |
| Total CaO, MgO, FeO | 33.95 | 32.87 | 35.15 | 34.61 | 30.56 | 28.94 | 27.14 | 25.91 | 23.62 | 20.27 |
| $Na_2O$ | 3.22 | 1.83 | 1.58 | 1.72 | 2.60 | 3.40 | 3.34 | 2.69 | 2.63 | 2.23 |
| $K_2O$ | 1.12 | 0.21 | 0.21 | 0.40 | 0.70 | 1.14 | 1.48 | 0.76 | 0.86 | 2.27 |
| Total Alkali | 4.34 | 2.04 | 1.79 | 2.12 | 3.30 | 4.54 | 4.82 | 3.45 | 3.49 | 4.50 |

TABLE 2

Desirable chemical compositions of calcium-iron-aluminosilicate mineral showing the desired ratios between various elements and sums of various elements

| Sample ID | CaO | MgO | $Al_2O_3$ | $Fe_2O_3$ | $SiO_2$ | Sum $Al_2O_3$ + $SiO_2$ + $Fe_2O_3$ (%) | Sum $Al_2O_3$ + $Fe_2O_3$ (%) | Ratio $Al_2O_3$ to $Fe_2O_3$ | Ratio $SiO_2$ to Sum ($Al_2O_3$ + $Fe_2O_3$) |
|---|---|---|---|---|---|---|---|---|---|
| LS36-10 | 14.77% | 6.11% | 14.09% | 13.07% | 45.20% | 72.36% | 27.16% | 1.08 | 1.66 |
| TDR | 12.70% | 7.27% | 17.60% | 12.90% | 49.50% | 80.00% | 30.50% | 1.36 | 1.62 |
| SND | 11.51% | 10.89% | 15.33% | 12.75% | 48.90% | 76.98% | 28.08% | 1.20 | 1.74 |
| AB | 11.51% | 11.06% | 12.49% | 14.20% | 47.20% | 73.89% | 26.69% | 0.88 | 1.77 |

TABLE 2-continued

Desirable chemical compositions of calcium-iron-aluminosilicate mineral showing the desired ratios between various elements and sums of various elements

| Sample ID | CaO | MgO | $Al_2O_3$ | $Fe_2O_3$ | $SiO_2$ | Sum $Al_2O_3$ + $SiO_2$ + $Fe_2O_3$ (%) | Sum $Al_2O_3$ + $Fe_2O_3$ (%) | Ratio $Al_2O_3$ to $Fe_2O_3$ | Ratio $SiO_2$ to Sum $(Al_2O_3$ + $Fe_2O_3)$ |
|---|---|---|---|---|---|---|---|---|---|
| BKP | 9.68% | 6.57% | 11.96% | 15.38% | 46.36% | 73.70% | 27.34% | 0.78 | 1.70 |
| PVT | 9.37% | 6.57% | 15.40% | 13.00% | 48.50% | 76.90% | 28.40% | 1.18 | 1.71 |
| RDF | 9.16% | 7.78% | 15.00% | 14.10% | 50.60% | 79.70% | 29.10% | 1.06 | 1.74 |
| THR | 8.94% | 4.94% | 14.53% | 12.03% | 52.85% | 79.41% | 26.56% | 1.21 | 1.99 |
| VCR | 8.84% | 4.93% | 14.87% | 9.85% | 54.94% | 79.66% | 24.72% | 1.51 | 2.22 |
| PTR | 6.69% | 6.37% | 13.05% | 7.21% | 60.39% | 80.65% | 20.26% | 1.81 | 2.98 |

All examples above are minerals sampled, processed and analyzed by the inventor from various location around the world. The three-letter designation refers to the mineral source. In the examples in Table 1 above, all samples except the PTR sample show desirable properties for use as a calcium-iron-aluminosilicate mineral to be used for the manufacture of lime or hydraulic cement or co-products such as pozzolans, alumina, silica and the like in accordance with the present invention.

These examples of a calcium-iron-aluminosilicate mineral show adequate amounts of calcium, alumina, iron and silica needed in the manufacture of lime, dolomitic lime, hydraulic cement or the by-products such as pozzolan, alumina, iron or silica. Of relevance is the Al to Fe ratio ($Al_2O_3/Fe_2O_3$) preferably close to 1 and more preferably approximately 0.75 to approximately 1.5 signifying that the use of this material will not increase both the amount of tricalcium aluminate (C3A) in clinker and the associated durability risks in the presence of sulfate environments in concrete applications. Additionally, the high $Fe_2O_3$ concentration will promote melt phase formation at lower temperature, in the later stages of the manufacturing process in accordance with the present invention, in acting as a flux, therefore improving burnability and reducing dusting at the kiln inlet as well as reducing the kiln processing time. This in turn reduces energy consumption and increases the output of the clinker production line.

It is also important to have a relatively low Si ratio to the sum of Fe and Al ($SiO_2/(Fe_2O_3+Al_2O_3)$) preferably of approximately 1.5, or more preferably approximately 1.25 to approximately 2.25 which will improve burnability as well and promote formation of tricalcium silicate (C3S) vs dicalcium silicate (C2S) in clinker in the final stage of this process if clinker production is desired. The improvement of burnability will decrease specific energy consumption of clinker burning, hence decreased $CO_2$ and NO, emissions from burning less fuel.

"Burnability" or "combinability" is a measure of how easily the raw materials react with each other for the formation of clinker from the raw meal. Coatability of a raw meal is related to its burnability also. With hard burning material, the coatability is low. It is actually measured by the free or nonreactive CaO % in the clinker. Because the iron, alumina and silica are already proportioned and combined in ideal ratios in a lava chamber pre-eruption, the calcium-iron-aluminosilicate mineral with the properties disclosed herein makes it easier to combine with the lime or CaO component to form a hydraulic cement clinker compared with minerals used to provide the iron, alumina and silica from separate minerals in a conventional clinker manufacturing process.

The calcium-iron-aluminosilicate mineral used in accordance with the present invention must also contain significant amounts of CaO, preferably approximately 4% to approximately 25%, most preferably as un-carbonated Ca, or a combination of un-carbonated and carbonated Ca, thus proportionally reducing or eliminating $CO_2$ emissions from the manufacturing process.

As used herein, the term "un-carbonated" elements means that elements such as calcium, magnesium and the like are contained in a matrix that are not in a carbonate form such as $CaCO_3$ or $MgCO_3$ so when dissolved in an acid or heated to a temperature up to the melting point does not emit or releases carbon dioxide.

As used herein, the term "carbonated" elements means that elements such as calcium, magnesium and the like are contained in a matrix that are in a carbonated form such as $CaCO_3$ or $MgCO_3$ so when dissolved in an acid or heated to a temperature up to the melting point emits or releases the carbon dioxide contained therein.

The same approach applies for MgO content, if desired to make a dolomitic lime a high MgO content is desired.

Mineralogy XRD data confirms some of the above mentioned, namely practical absence of quartz. The absence of quartz has an additional positive impact, in conjunction with the sandy nature of the quartz material used in current practice. Quartz is a hard mineral requiring high and specific grinding energy in raw meal production. The calcium-iron-aluminosilicate mineral contains CaO that is distributed between amorphous, optionally carbonates and/or feldspars, which in turn will contribute to decreasing or eliminate $CO_2$ emissions during the manufacturing process.

The use of this material should be preferred to a mix of correctives where each component serves as an individual carrier of one main element, because the presence of finely distributed main elements in the same material makes solid state reactions easier to take place without the need of excessive grinding fineness; the absence of quartz, when compared to natural sand addition, has a similar positive effect on burnability and reduction of specific heat consumption.

There are multiple effects induced by the presence of quartz. One is due to the very stable large crystal structure, so formation of calcium silicates can be more difficult and requires either higher fineness to increase specific surface and improve solid state reactions to the fullest, or more energy in the kiln (burning T or residence time) or both; another is the quartz hardness which requires more grinding energy; there might also be a problem of higher wear on transport and grinding media, but for small additions this is rather speculative.

The first three samples in Table 1 and 2 above, LS36-10, TDR and SND, show a basaltic chemistry with the CaO content of approximately 11-14%, MgO content of approximately 6-11%, $SiO_2$ of approximately 45-47% and $Al_2O_3$ of 14-17.6% this results in a total silica and alumina content of 59.29-63.03%, and a total amount of uncarbonated calcium, magnesium and iron oxides of approximately 32-35%.

The next three samples, AB, BKP and PVT, have similar basaltic chemical composition of CaO content of approximately 9-11%, MgO content of approximately 5-11%, total silica and alumina content of 59.69-63.9% and a total amount of uncarbonated calcium, magnesium and iron oxides of 28.94-34.61%.

The next two samples, RDF and THR, have similar basaltic chemical composition of CaO content of approximately 9%, MgO content of approximately 5-8%, total silica and alumina content slightly higher of 65.6-67.38% and a total amount of uncarbonated calcium, magnesium and iron oxides of 25.91-27.14%.

The next sample, VCR, has an intermediate chemical composition of CaO content of approximately 8.84%, MgO content of approximately 4.93%, and total silica and alumina slightly higher of 69.81%

The last sample, PTR, has an andesitic chemical composition of CaO content of approximately 6.69%, MgO content of approximately 6.37%, and total silica and alumina slightly higher of 73.44%

Chemical composition as reported herein is measured by the XRF (X-ray fluorescence) method. This is a non-destructive analytical technique used to determine the elemental composition of materials. XRF analyzers determine the chemistry of a sample by measuring the fluorescent (or secondary) X-ray emitted from a sample when it is excited by a primary X-ray source. Each of the elements present in a sample produces a set of characteristic fluorescent X-rays ("a fingerprint") that is unique for that specific element, which is why XRF spectroscopy is an excellent technology for qualitative and quantitative analysis of material composition. The chemical analysis reported herein is the total oxides scan. All percentages reported herein are by weight.

Sample preparation for XRF can be achieved using either of two distinct methods: a pressed powder and a fused glass disk. Pressed powder specimens are typically ground in a tungsten carbide ring and puck mill with a binding agent to reduce the particle size and provide a packed powder mount that will remain intact for transport and analysis. The advantages of this preparation method include the simplicity and better detection limits while disadvantages include what is known as the "mineralogical effect", which requires a similar matrix between a bracketed calibration and unknown specimens for the calibrations to be valid.

In case of the calcium-iron-aluminosilicate mineral such as hyaloclastites, lava, gabbro, scoria, volcanic ashes, pumice, etc., they may contain some degree of crystalline elements, the calcium, iron, alumina, silicates, and other elements are contained in micro-crystals, such as clinopyroxene $Ca(Mg,Fe,Al,Ti)(Si,Al)_2O_6$, calcium plagioclase feldspars $(Na,Ca)Al(Si,Al)_3O_8$, olivine $(Fe,Mg)_2SiO_4$ are examples of crystalline materials that contain uncarbonated elements, such as calcium, magnesium, potassium, sodium and iron, that are available to be leached out or dissolved by a first acid, to manufacture lime, dolomitic lime, hydraulic cement or co-products such as pozzolan, alumina, silica and the like in accordance with this present invention. The calcium, iron, aluminum, silica elements, and others, can be found in metamorphic rocks, lava, gabbro, scoria, volcanic ashes, pumices and hyaloclastites of these chemistries can be in amorphous or microcrystalline form or a combination thereof.

Table 3 below shows examples of calcium-alumino-ironsilicate such hyaloclastites, lava, volcanic ashes, or pumices that contain various amounts of amorphous and crystalline content. Samples 14 and 15 are rhyolitic glass such as perlite and the CaO content is below 1% compared with the basaltic in Samples 1-13 where CaO ranges between 9-16%.

TABLE 3

| | "Amorphous" | Clinopyroxene $Ca(Mg, Fe, Al, Ti)(Si, Al)_2O_6$ | Plagioclase Feldspar $(Na, Ca)Al(Si, Al)_3O_8$ | Olivine $(Fe,Mg)_2SiO_4$ | Calcite | Unidentified |
|---|---|---|---|---|---|---|
| 1 | >70 | — | 12 | 5 | 7 | <5 |
| 2 | >80 | | 10 | <5 | — | <5 |
| 3 | >70 | <3? | 11 | <5 | — | <5 |
| 4 | >80 | — | 13 | <3 | — | <5 |
| 5 | >55 | | 12 | 5 | 20 | <5 |
| 6 | >70 | — | 11 | 5 | <5 | <5 |
| 7 | >75 | — | 10 | 5 | — | <5 |
| 8 | >65 | — | 15 | 5 | <5 | <5 |
| 9 | >70 | <3? | 12 | 5 | | <5 |
| 10 | >30 | 25 | 43 | 5 | | <5 |
| 11 | >55 | | 15 | 5 | 15 | <5 |
| 12 | >40 | 17 | 37 | 4 | 1 | <5 |
| 13 | >70 | — | 15 | 8 | | <5 |
| 14 | >95 | | | | | <5 |
| 15 | >95 | | | | | <5 |

Samples 1 to 13 in Table 3 above have desirable compositions for use in accordance with the present invention for manufacturing lime, dolomitic lime or hydraulic cement and other co-products such as pozzolan, alumina, silica and the like.

In one disclosed embodiment of the present invention, the calcium-iron-aluminosilicate mineral is combined with a first acid, such as hydrochloric acid to create a first salt, such as a calcium chlorite and optionally a magnesium chlorite salt, for the manufacture of lime, dolomitic lime, hydraulic cement and other co-products such as pozzolan, alumina, silica and the like, such as hyaloclastite, lava, gabbro, scoria, volcanic ash or pumice, or any other igneous or metamorphic rock, calcium-iron-aluminosilicate mineral within the chemical composition preferably comprises approximately 30 to approximately 57 percent by weight $SiO_2$, approximately 10 to approximately 18 percent by weight $Al_2O_3$, approximately 8 to approximately 18 percent by weight $Fe_2O_3$, and approximately 4 to approximately 25 percent by weight CaO and preferably wherein the sum of the $Al_2O_3$+$Fe_2O_3$ is between approximately 20 to approximately percent by weight, preferably wherein the ratio between the $Al_2O_3$ and the $Fe_2O_3$ is approximately 0.75 and approximately 1.50 ideally or approximately 1 and the ratio between the $SiO_2$ and the sum of the $Al_2O_3$+$Fe_2O_3$ is preferably between approximately 1.25 and 2.25, ideally approximately 1.5.

In addition to the foregoing, other compounds can be present in small amounts, such as $K_2O$, $TiO_2$, $P_2O_5$, MnO, various metals, rare earth trace elements and other unidentified elements. When combined, these other compounds represent less than 10% by weight of the total chemical composition of the calcium-iron-aluminosilicate mineral such as hyaloclastite, lava, gabbro, scoria, volcanic ash or pumice mineral.

In another disclosed embodiment, the hyaloclastite, volcanic ash or pumice in accordance with the present invention preferably has a density or specific gravity of approximately 2.4 to approximately 3.1.

The calcium-iron-aluminosilicate mineral in accordance with the present invention can be in crystalline or amorphous (glassy) form and is usually found as a combination of both in varying proportions. Preferably, the calcium-iron-aluminosilicate mineral such the hyaloclastite, lava, volcanic ash or pumice in accordance with the present invention comprises approximately 5% to 95% by weight amorphous form, more preferably approximately 10% to approximately 80% by weight amorphous form, most preferably approximately 20% to approximately 60% by weight amorphous form, especially approximately 30% to approximately 50% by weight amorphous form. The crystalline portion calcium-iron-aluminosilicate mineral in accordance with the present invention, such as hyaloclastite, lava, scoria or pumice preferably comprises approximately 5% to approximately 95% crystalline form wherein the crystalline form is optionally one or more of approximately 3% to approximately 20% by weight olivine, approximately 5% to approximately 40% by weight clinopyroxene, approximately 5% to approximately 60% by weight plagioclase, and approximately 0% to approximately 40% (or less than 40%) by weight other minerals including, but not limited to, magnetite, UlvoSpinel, quartz, feldspar, pyrite, illite, hematite, chlorite, calcite, hornblende, biotite, K-feldspars, mordenite, clinoamphibole, ilmenite hypersthene (an orthopyroxene), feldspathoids sulfides, metals, rare earth minerals, other unidentified minerals and combinations thereof. The foregoing ranges include all of the intermediate values.

In another disclosed embodiment, the present invention comprises a calcium-iron-aluminosilicate mineral in fine or powder form of sufficiently small size to allow for acid dissolution thereof. Similarly, the particle size of the calcium-iron-aluminosilicate mineral fines or powder is sufficiently small such that the carbonatable mineral powder can be dissolved in an alkaline or acidic solution. The calcium-iron-aluminosilicate mineral preferably has a volume-based mean particle size of less than or equal to approximately 500 µm, more preferably less than or equal to 300 µm, preferably less than or equal to approximately 200 µm, preferably less than or equal to approximately 100 µm, more preferably less than or equal to approximately 80 µm, most preferably less than or equal to approximately 60 µm, especially less than or equal to approximately 40 µm, more especially less than or equal to approximately 20 µm. The smaller the particle size for the hyaloclastite, volcanic ash or pumice powder the better. However, there are economic limits for grinding rock to small particle sizes. The foregoing ranges include all of the intermediate values.

If the calcium-iron-aluminosilicate mineral is found in a fine size or powder form with a particle size sufficiently small to be dissolved in an acidic solution, such as the particle size described herein, then the grinding process described herein can be omitted. Optionally, such minerals can be screened or classified to obtain the desired particle size or particles size range. All subsequent steps to the process described herein are applicable.

To achieve the desired particles size, the calcium-iron-aluminosilicate mineral can be ground using conventional mineral grinding equipment including, but not limited to, a ball mill, a roll mill or a plate mill. A particle size classifier can be used in conjunction with the mill to achieve the desired particle size. Equipment for grinding and classifying calcium-iron-aluminosilicate mineral to the desired particle size is commercially available from, for example, F. L. Smidth, Bethlehem, PA; Metso, Helsinki, Finland, Loesche, Germany and others. The ground mineral fines or powder is then classified by screening the powder with mesh screen or sieve or by any other method.

Alternatively, the mineral can be reduced to the desired particle size using a wet mill process. Wet milling, also called wet media milling, is a process in which particles are dispersed in a liquid by shearing, by impact or crushing, or by attrition. A mill is charged with media (small beads or spheres) and activated by a high-speed agitator shaft to separate the individual particles. When the agitator rotates, it transmits kinetic energy to the media. When the material is pumped through the mill, this energy acts on the solids suspended in a liquid (slurry) to tear them apart (shearing) or crush them, reducing them in size. The particles are simultaneously dispersed in the liquid which is then ready for use or can be dried and separated for use in other products. The wet mill liquid used may contain a first acid as described in the present invention.

Preferably, but not necessarily, in any of the methods disclosed herein, the first reacting step/phase comprises combining or reacting the calcium-iron-aluminosilicate mineral with a first acid, such as hydrochloric acid, to form at least one first salt, such as chloride salt, such as aqueous calcium chloride, aqueous magnesium chlorite, aqueous aluminum chloride, and solid silica. Preferably, but not necessarily, in any of the methods disclosed herein, the first separating step comprises separating a first aqueous fraction comprising the first aqueous salt, such as calcium chloride, aqueous magnesium chlorite and/or the aqueous aluminum chloride, from a first solid fraction comprising the solid silica. It is noted that the greater the amorphous content of the calcium-iron-aluminosilicate mineral the more efficient the first acid dissolution step to leach out the desirable elements via the first chlorite salt formation. However, a desirable ratio of amorphous and crystalline will make it such that a portion of the mineral will dissolve and another portion of the mineral may not dissolve in the first acid. Alternatively, the calcium oxide from the matrix of the calcium-iron-aluminosilicate mineral may dissolve first either from the amorphous or the crystalline portion of the calcium-iron-aluminosilicate mineral leaving the rest of the elemental composition in a state close to the initial crystalline or amorphous state minus the leached elements. In other words, it may be desirable to selectively leach out only the desired element to create the first salt based on the ratio of amorphous vs. crystalline make-up of the of the calciumiron-aluminosilicate mineral. The undissolved portion of the mineral, ideally containing one of more of alumina, silica and iron oxide can then be separated and used as a pozzolan especially if in an amorphous matrix. Optionally, the undissolved portion of the mineral, ideally containing the alumina, silica and iron oxide can be separated from the first salt and used in the step three below to combine with the calcium sulfate to manufacture lime, dolomitic lime or hydraulic cement containing calcium oxide, alite and/or belite. Alternatively, the undissolved portion of the mineral, ideally containing alumina, silica and/or iron oxide can be separated from the first salt and used in any other process or for any other purpose.

Preferably, but not necessarily, in any of the methods disclosed herein, the second reacting step/phase comprises reacting the first chlorite salt, such as at least the aqueous calcium chloride, optionally the aqueous aluminum chloride, and a second acid, such as sulfuric or sulfurous acid, to form at least a second salt, such as calcium salt such as solid calcium sulfate or sulfite, aqueous aluminum sulfate or sulfite, and hydrochloric acid. Alternatively, the second reacting step or phase 2 of the process skips the first step above where the calcium-iron-aluminosilicate is first reacted with a sulfuric or sulfurous acid to create a sulfate or sulfite salt, such a calcium sulfate or calcium sulfite, aluminum sulfate or aluminum sulfite. Alternatively, the calcium oxide from the matrix of the calcium-iron-aluminosilicate mineral may dissolve first either from the amorphous or the crystalline portion of the calcium-iron-aluminosilicate mineral leaving the rest of the elemental composition in a state close to the initial crystalline or amorphous state minus the leached elements. In other words, it may be desirable to selectively leach out only the desired element to create the sulfate or sulfite salt based on the ratio of amorphous vs. crystalline make-up of the of the calcium-iron-aluminosilicate mineral. The undissolved portion of the mineral, ideally containing the alumina, silica and iron oxide can then be separated and used as a pozzolan especially if in an amorphous matrix. Optionally, the undissolved portion of the mineral, ideally containing the alumina, silica and iron oxide can be separated from the sulfate or sulfite salt and used in the step three below to combine with the calcium sulfate or sulfite to manufacture lime, dolomitic lime or hydraulic cement containing calcium oxide, alite and/or belite. Alternatively, the undissolved portion of the mineral, ideally containing alumina, silica and/or iron oxide can be separated from the first salt and used in any other process or for any other purpose.

Preferably, but not necessarily, in any of the methods disclosed herein, the third step/phase is a thermally treating process, comprising heating the second salt, such as calcium sulfate or sulfite or a combination thereof, with a ratio of 1:3 between the two to form calcium oxide. The desorbtion of $SO_2$ is a highly endothermic reaction requiring temperatures of above 1100° C. (step three (a)). Optionally, to reduce the temperature of step three above an option step three (b) the calcium sulfate or sulfite or a combination thereof is first mixed with sufficient amount of alumina, silica and iron oxide in proportions required to make a hydraulic cement containing calcium oxide, and/or alite and/or belite. The source of the alumina, silica and iron oxide can be the undissolved co-product of step one as described above or the initial calcium-iron-aluminosilicate mineral in appropriate ratios. Alternatively, calcium oxide can be combined with a suitable source of iron, alumina and silica typically used in the portland cement manufacture process. The heating process of step three (b) to obtain calcium oxide from calcium sulfate or sulfite decreases to about 900° C. in the presence of the silica, alumina and iron oxide. The heating process of step 3(a) and 3(b) can be performed in a conventional kiln, a fluid bed, such as a circulating fluid bed, or a vibratory plate microwave oven. The fuel used in a kiln or fluid bed can be a hydrocarbon fuel such as coal, natural gas (methane) or coke. In the case of the fuel being a hydrocarbon, the calcium sulfate can be reduced with carbon to partially create calcium sulfite in a ratio of 1:3. One part calcium sulfate and 3 parts calcium sulfite plus heat then results in calcium oxide and sulfur dioxide. In the final step of the phase 3, the sulfur dioxide is than combined with half oxygen and water to create sulfuric acid. Any other type of fuel can be used to generate a sufficient amount of heat to the desired temperature to produce the calcium oxide and/or the hydraulic cement clinker.

Optionally, any of the methods disclosed herein comprise an ion exchange step; wherein the ion exchange step comprises exchanging one or more anions of the first calcium salt and/or the second calcium salt for one or more hydroxyl anions to form a third calcium salt. Optionally, the ion exchange step comprises reacting the first calcium salt and/or the second calcium salt with a chelating agent to form a calcium-chelator compound and reacting the calcium-chelator compound with a base to form the third calcium salt. Optionally, the ion exchange step comprises reacting the first calcium salt and/or the second calcium salt with a base to form the third calcium salt. Optionally, the ion exchange step comprises using an ion exchange membrane to perform the exchanging one or more anions of the first calcium salt and/or the second calcium salt for one or more hydroxyl anions to form the third calcium salt. Optionally, the one or more calcium salts of the thermally treating step is the third calcium salt. Optionally, the third calcium salt is $Ca(OH)_2$. Optionally, any of the methods disclosed herein comprises a step of regenerating the chelating agent, wherein the step of regenerating the chelating agent comprises producing the third calcium salt. Optionally, any of the methods disclosed herein comprise a step of forming the first cement material from the third calcium salt. Optionally, the step of forming the first cement material from the third calcium salt comprises dehydrating the third calcium salt or directly releasing the first cement material from the calcium-chelator compound, optionally via a base. For example, CaO can be formed by using a chelating agent or base to react the $CaCl_2$, $CaSO_3$, or $CaSO_4$. For example, then the chelating agent or base can be regenerated in a manner that releases $Ca(OH)_2$ which can be dehydrated to CaO or CaO could be directly released from the chelator. For example, if $CaSO_4$ is precipitated, a chelating agent such as EDTA can be reacted with $CaSO_4$ to make Ca-EDTA. For example, a base, such as NaOH, can then be used to directly produce $Ca(OH)_2$ and regenerate the EDTA.

Preferably, but not necessarily, any method disclosed herein can comprise a step of forming the first acid; wherein: (i) the first reacting step comprises the step of forming the first acid and the step of forming the first acid occurs simultaneously with the first reacting step, or (ii) the step of forming the first acid is performed separately from the first reacting step. Optionally, any method disclosed herein can comprise a step of forming the first acid; wherein the first reacting step comprises the step of forming the first acid and the step of forming the first acid occurs simultaneously with the first reacting step. Optionally, any method disclosed herein can comprise a step of forming the first acid; wherein the step of forming the first acid is performed separately from the first reacting step.

Preferably, but not necessarily, any method disclosed herein can comprise a step of forming the second acid, such as a sulfuric or sulfite acid; wherein: (i) the third reacting step comprises the step of forming the second acid and the step of forming the second acid occurs simultaneously with the second reacting step, or (ii) the step of forming the second acid is performed separately from the third reacting step. Optionally, any method disclosed herein can comprise a step of forming the second acid; wherein the third reacting step comprises the step of forming the second acid and the step of forming the second acid occurs simultaneously or at the end of the third reacting step. Optionally, any method disclosed herein can comprise a step of forming the second acid; wherein the step of forming the second acid is performed separately from the second or third reacting step. Optionally, in any of the methods disclosed herein, the step of forming the second acid can comprise reacting $SO_2$ with water to form $H_2SO_3$ and/or $H_2SO_4$; wherein the second acid is $H_2SO_3$ and/or $H_2SO_4$. Optionally, in any of the methods disclosed herein, the second acid is $H_2SO_3$ and/or $H_2SO_4$ and wherein the second salt is a calcium salt, wherein the calcium salt is $CaSO_3$ and/or $CaSO_4$, respectively.

Alternatively, the process above can be modified such that in Step 1 or Phase 1 the calcium-iron-aluminosilicate mineral is combined with a first acid such as sulfuric or sulfurous acid and results in a first salt, where the resulting first salt is one or more of a sulfate or sulfite such as calcium sulfate or sulfite, magnesium sulfate or sulfite and/or aluminum sulfate or sulfite and a solid fraction comprising the solid silica. The time and temperature of the first reaction is controlled so that a portion of the calcium-iron-aluminosilicate mineral dissolves and another portion of the mineral dissolve at a slower rate or only partially dissolves in the first acid. Alternatively, the calcium oxide from the matrix of the calcium-iron-aluminosilicate mineral can dissolve first either from the amorphous or the crystalline portion of the calcium-iron-aluminosilicate mineral leaving the rest of the elemental composition in a state close to the initial crystalline or amorphous state minus the leached elements or it can dissolve at different rates between the amorphous or crystalline portion of the mineral. In other words, it may be desirable to selectively leach out only the desired element, preferably calcium, to create the first salt based on the ratio of amorphous vs. crystalline make-up of the calcium-iron-aluminosilicate mineral. The undissolved portion of the mineral, if any, ideally containing the alumina, silica and iron oxide is then separated and used as a pozzolan especially if in an amorphous matrix. Optionally, the undissolved portion of the mineral, ideally containing the alumina, silica and iron oxide can be separated from the first salt and used in step three below to combine with the calcium sulfate or sulfite to manufacture lime, dolomitic lime or hydraulic cement containing calcium oxide, alite and/or belite. Alternatively, the undissolved or partially dissolved portion of the mineral, ideally containing alumina, silica and iron oxide can be separated from the first chlorite salt and used for any other purpose in any other process.

Typical cement manufacturing is a complex process that begins with mining and then grinding raw materials that include limestone, clay and additional corrective minerals to provide the appropriate amount of iron, alumina and silica, to a fine powder, called raw meal, which is then heated to a sintering temperature as high as 1450° C. in a cement kiln. In the conventional limestone calcination clinker manufacturing process, a total of 1.55 tons of raw meal is needed for each ton of cement clinker produced. In other words, the delta of 0.55 tons is composed of the carbon dioxide released from limestone and minor amounts of other gases released during the calcination process. In this process, the chemical bonds of the raw materials are broken down and then they are recombined into new compounds. The result is called clinker, which are rounded nodules between 1 mm and 25 mm across. The clinker is ground to a fine powder in a cement mill and mixed with gypsum to create cement. The powdered cement is then mixed with water and aggregates to form concrete that is used in construction. Clinker quality depends on raw material composition, which has to be closely monitored to ensure the quality of the cement. Excess free lime, for example, results in undesirable effects such as volume expansion, increased setting time or reduced strength. However, when concrete uses a cement with a high pozzolan content this may not be as critical.

There are four main phases involved in the clinker manufacturing process. Clinker is formed at a high temperature (1,450° C.) in a cement kiln by mixing limestone, iron, alumina and silica and feeding it into the kiln at the low temperature end with the raw mix traveling towards the hot end of the kiln where the different phases as shown in the Table 4 below take place along the way from the low to the hot temperature end. Additionally, once clinker has cooled it is mixed and ground with gypsum to avoid the flash setting due to the very fast hydration of the tricalcium aluminate ($C_3A$) to prepare the cement powder. Optionally, limestone is added and ground with cement clinker and gypsum as a filler addition to reduce the clinker factor. Alternatively, a pozzolan can also be added to the grinding of clinker or blended with the cement powder once it has been ground with gypsum.

The four compounds or mineral constituents referred to as $C_3S$, $C_2S$, $C_3A$ and $C_4AF$ are known as the main crystalline phases of portland cement. The phase composition of a particular cement clinker can be quantified through a complex set of calculation known as the Bogue formula or equations.

Typical phases and mineral constituents of clinker plus gypsum found in conventional portland cement powder are shown in Table 4 below.

TABLE 4

Typical constituents of portland clinker plus gypsum shown using cement chemist notation (CCN)

| Name | Formula | Mineral Phase | CCN | Mass |
|---|---|---|---|---|
| Tricalcium silicate | $(CaO)_3 \cdot SiO_2$ | Alite | $C_3S$ | 25-50% |
| Dicalcium silicate | $(CaO)_2 \cdot SiO_2$ | Belite | $C_2S$ | 20-45% |
| Tricalcium aluminate | $(CaO)_3 \cdot Al_2O_3$ | Aluminate or Celite | $C_3A$ | 5-12% |
| Tetracalcium aluminoferrite | $(CaO)_4 \cdot Al_2O_3 \cdot Fe_2O_3$ | Ferrite | $C_4AF$ | 6-12% |
| Gypsum | $CaSO_4 \cdot 2\,H_2O$ | | $C\bar{S}H_2$ | 2-10% |

Portland cement can also be analyzed by the oxide composition with value ranges shown in the Table 5 below.

TABLE 5

Typical constituents of portland cement shown using cement chemist notation (CCN)

| Clinker | CCN | Mass |
|---|---|---|
| Calcium oxide, CaO | C | 61-67% |
| Silicon dioxide, $SiO_2$ | S | 19-23% |
| Aluminum oxide, $Al_2O_3$ | A | 2.5-6% |
| Ferric oxide, $Fe_2O_3$ | F | 0-6% |
| Sulfur (VI) oxide, $SO_3$ | S | 1.5-4.5% |

Additionally, the following parameters are calculated in the process of clinker making process:

Lime Saturation Factor (LSF):

The Lime Saturation Factor is a ratio of CaO to the other three main oxides. Applied to clinker, it is calculated as: $LSF=CaO/(2.8SiO_2+1.2Al_2O_3+0.65Fe_2O_3)$. Often, this is referred to as a percentage and therefore multiplied by 100. The LSF controls the ratio of alite to belite in the clinker. A clinker with a higher LSF will have a higher proportion of alite to belite than will a clinker with a low LSF. Typical LSF values in modern clinkers are 0.92-0.98, or 92%-98%.

Silica Ratio (SR): The Silica Ratio (also known as the Silica Modulus) is defined as: $SR=SiO_2/(Al_2O_3+Fe_2O_3)$. A high silica ratio means that more calcium silicates are present in the clinker and less aluminate and ferrite. SR is typically between 2.0 and 3.0.

Alumina Ratio (AR) The alumina ratio is defined as: $AR=Al_2O_3/(Fe_2O_3)$. This determines the potential relative proportions of aluminate and ferrite phases in the clinker. An increase in clinker AR (also sometimes written as A/F) means there will be proportionally more aluminate and less ferrite in the clinker. In ordinary portland cement clinker, the AR is usually between 1 and 4. The above three parameters are those most commonly used. A fourth, the 'Lime Combination Factor' (LCF), is the same as the LSF parameter, but with the clinker free lime content subtracted from the total CaO content. With an LCF=1.0, therefore, the maximum amount of silica is present as $C_3S$.

In one disclosed embodiment the present invention involves a hydraulic cement manufacturing process using a natural calcium-iron-aluminosilicate mineral within the chemical composition preferably comprises approximately 30 to approximately 57 percent by weight $SiO_2$, approximately 10 to approximately 18 percent by weight $Al_2O_3$, approximately 5 to approximately 18 percent by weight $Fe_2O_3$, and approximately 4 to approximately 25 percent by weight CaO and preferably wherein the sum of the $Al_2O_3+Fe_2O_3$ is between approximately 20 to approximately percent by weight, preferably wherein the ratio between the $Al_2O_3$ and the $Fe_2O_3$ is approximately 0.75 and approximately 1.50 ideally or approximately 1 and the ratio between the $SiO_2$ and the sum of the $Al_2O_3+Fe_2O_3$ is preferably between approximately 1.25 and 2.25, ideally approximately 1.5, to produce lime or hydrated lime.

In another disclosed embodiment the lime produced through the manufacturing process described above is further combined with iron, alumina and silica either resulting from the same manufacturing process as the lime or from separate minerals or from the same calcium-iron-aluminosilicate mineral used to produce lime and calcining the combined lime, iron, alumina and silica at a temperature sufficiently high to sinter these elements together to produce a hydraulic cement clinker.

Depending on the type of fuel used to heat the clinker making kiln and other factors such as minor constituents found in the components of the raw meal minerals, and to meet certain standards of emissions or clinker specifications that may vary from plant to plant and from jurisdiction to jurisdiction, a variety of compounds may be used to correct any one of the elements in the final composition of the clinker and or the composition of the exhaust gases such as emissions. These compounds may be combined with the raw meal, combined with the fuel or injected into the kiln at various kiln locations and by various means depending on the specific needs and conditions needed to be met, among them carbon capture and the like. These optional processes may be known in the art and some may still have yet to be developed and the rules and regulations affecting the cement industry are under constant review and update. These minor compounds or corrective means to meet product standards and emissions are not the subject of this invention but may be incorporated into the present invention without altering these teachings.

The lime produced in accordance with this invention can be combined to produce a hydraulic cement clinker using the process described in U.S. patent application Ser. No. 18/737,977 filed Jun. 8, 2023 (the disclosure of which is incorporated herein by reference in its entirety).

The following examples are illustrative of selected embodiments of the present invention and are not intended to limit the scope of the invention.

Example 1

A calcium-iron-aluminosilicate mineral within the chemical composition preferably comprises approximately 30 to approximately 57 percent by weight $SiO_2$, approximately 10 to approximately 18 percent by weight $Al_2O_3$, approximately 8 to approximately 18 percent by weight $Fe_2O_3$, and approximately 4 to approximately 25 percent by weight CaO and preferably wherein the sum of the $Al_2O_3+Fe_2O_3$ is between approximately 20 to approximately percent by weight, preferably wherein the ratio between the $Al_2O_3$ and the $Fe_2O_3$ is approximately 0.75 and approximately 1.50 ideally or approximately 1 and the ratio between the $SiO_2$ and the sum of the $Al_2O_3+Fe_2O_3$ is preferably between approximately 1.25 and 2.25 ideally or approximately 1.5 and an amorphous content of approximately 50% and crystalline content of approximately 50% is screened or ground to a volume-based mean particle size of approximately 200 microns.

Step 1 or Phase 1 the calcium-iron-aluminosilicate mineral is combined with a first acid, such as hydrochloric acid, thereby forming a first salt, where the first salt is calcium chloride, aqueous magnesium chlorite and/or the aqueous aluminum chloride from a first solid fraction comprising the solid silica. The time and temperature of the first reaction is controlled so that a portion of the calcium-iron-aluminosilicate mineral will dissolve and another portion of the mineral may not dissolve in the first acid. Alternatively, the calcium oxide from the matrix of the calcium-iron-aluminosilicate mineral may dissolve first either from the amorphous or the crystalline portion of the calcium-iron-aluminosilicate mineral leaving the rest of the elemental composition in a state close to the initial crystalline or amorphous state minus the leached elements. In other words, it may be desirable to selectively leach out only the desired element to create the first salt based on the ratio of amorphous vs. crystalline make-up of the of the calcium-iron-aluminosilicate mineral. The undissolved portion of the mineral, if any, ideally containing the alumina, silica and iron oxide is then separated and used as a pozzolan especially if in an amorphous matrix. Alternatively, one or more of the alumina, silica and/or iron may dissolve into separate compounds or combinations thereof and used for any purpose. Optionally, the undissolved portion of the mineral, ideally containing the alumina, silica and iron oxide can be separated from the first chlorite salt and used in step three below to combine with the calcium sulfate or sulfite to manufacture lime, dolomitic lime or hydraulic cement containing calcium oxide, alite and/or belite.

$$Hyaloclastite\ (CaFe_2Al_2Si_2O_8)+8HCl \rightarrow CaCl_{2(aq)}+2AlCl_{3(aq)}+Fe_2O_2+SiO_{2(s)},\ or$$

$$Hyaloclastite\ (CaFe_2Al_2Si_2O_8)+8HCl \rightarrow CaCl_{2(aq)}+Fe_2Al_2SiO_{2(s)},$$

Step 2 or Phase 2 comprises reacting the first chlorite salt such as at least the aqueous calcium chloride, optionally the aqueous aluminum chloride, and a second acid such as sulfuric or sulfurous acid to form at least a second salt such as a calcium salt such as solid calcium sulfate or sulfite, aqueous aluminum sulfate or sulfite, and hydrochloric acid.

$CaCl_{2(aq)}+H_2SO_4 \rightarrow CaSO_4$ (s) 2HCl; wherein: the first calcium salt is $CaCl_2$; the first acid is HCl; the second acid is $H_2SO_4$; and the second calcium salt is $CaSO_4$, or $CaCl_{2(q)}+H_2SO_3 \rightarrow CaSO_3$ (s) 2HCl; wherein: the first calcium salt is $CaCl_2$); the first acid is HCl; the second acid is $H_2SO_3$; and the second calcium salt is $CaSO_3$.

Step 3 or Phase 3 of the process will be as follows: a thermally treating process, comprising heating the second salt, such as calcium sulfate or sulfite or a combination thereof with a ratio of approximately 1:3 between the two, to form calcium oxide. The desorption of $SO_2$ is a highly endothermic reaction requiring temperatures of above 1100° C. The heating process can be performed in a conventional kiln, a fluid bed, such as a circulating fluid bed, or a vibratory plate microwave oven. The fuel used in a kiln or fluid bed can be a hydrocarbon fuel such as coal, natural gas (methane) or coke. In the case of the fuel being a hydrocarbon, the calcium sulfate can be reduced with carbon to partially create calcium sulfite in a ratio of 1:3. This is fed to a simple rotary kiln and burned to produce lime from the hot end of the kiln and an exhaust gas containing sulfur dioxide. Firstly, at 500-700° C., the available carbon from the coke reduces about a quarter of the calcium sulfate to calcium sulfide.

$$CaSO_4+2C \rightarrow CaS+2CO_2$$

$$or\ CaSO_4+CH_4 \rightarrow CaS+CO_2+2H_2O \qquad \text{Equation 1:}$$

Next, at a temperature of 800-1000° C. the rest of the calcium sulfate reacts with the calcium sulfide to produce calcium oxide (lime).

$$3CaSO_4+CaS \rightarrow 4CaO+4SO_2$$

$$or\ CaSO_4+H_2O \rightarrow CaO+H_2SO_4 \qquad \text{Equation 2:}$$

The lime is then rapidly cooled in the usual manner. The exhaust gases are de-dusted and cooled by water-washing, further cleaned with mist precipitators, then dried by scrubbing with sulfuric acid. The gas now contains only sulfur dioxide (about 9%), carbon dioxide, a little oxygen and nitrogen+inerts. Air is then admitted to bring the sulfur dioxide to around 6.5%, ensuring a two-fold excess of oxygen for the oxidation.

$$2SO_2+O_2 \rightarrow 2SO_3 \qquad \text{Equation 3:}$$

Finally sulfuric acid is formed by reaction with water.

$$SO_3+H_2O \rightarrow H_2SO_4 \qquad \text{Equation 4:}$$

The clean dry gases pass through blowers into heat exchangers in which hot product gases are cooled while the input gas is heated to 400-410° C. The gas then enters a catalyst-packed converter. The usual catalyst is doped vanadium pentoxide. The oxidation is exothermic, so in order to prevent temperature from running out of control, heat is exchanged with the cold input gas. Several cycles of heat exchange and conversion take place. The blowers are sized to provide ample draught for the kiln system and to deliver the 200 kPa required to push the gas through the multiple resistant catalyst beds.

The cooled converted gases are finally scrubbed in a counter-flow tower fed with 98% sulfuric acid to produce an oleum, which can be taken as product or diluted with more dilute acid from the drying towers, or with fresh water. The final products are hot and required water cooling to bring them to handleable temperature for storage.

A simplified stoichiometry implies that one mole of calcium sulfate gives rise to one mole of calcium oxide (56.08 g) and one mole of sulfuric acid (98.08 g).

Example 2

A calcium-iron-aluminosilicate mineral within the chemical composition preferably comprises approximately 30 to approximately 57 percent by weight $SiO_2$, approximately 10 to approximately 18 percent by weight $Al_2O_3$, approximately 8 to approximately 18 percent by weight $Fe_2O_3$, and approximately 4 to approximately 25 percent by weight CaO and preferably wherein the sum of the $Al_2O_3+Fe_2O_3$ is between approximately 20 to approximately percent by weight, preferably wherein the ratio between the $Al_2O_3$ and the $Fe_2O_3$ is approximately 0.75 and approximately 1.50 ideally or approximately 1 and the ratio between the $SiO_2$ and the sum of the $Al_2O_3+Fe_2O_3$ is preferably between approximately 1.25 and 2.25 ideally or approximately 1.5 and an amorphous content of approximately 50% and crystalline content of approximately 50% is ground to a volume-based mean particle size of approximately 100 microns.

Step 1 or Phase 1 the ground calcium-iron-aluminosilicate mineral is combined with a first acid such as sulfuric or sulfurous acid and results in a first salt, where the first salt is sulfate or sulfite such as calcium sulfate or sulfite, magnesium sulfate or sulfite and/or the aluminum sulfate or sulfite and a solid fraction comprising the solid silica. The time and temperature of the first reaction is controlled so that a portion of the calcium-iron-aluminosilicate mineral dissolves and another portion of the mineral does not dissolve in the first acid. Alternatively, the calcium oxide from the matrix of the calcium-iron-aluminosilicate mineral can dissolve first either from the amorphous or the crystalline portion of the calcium-iron-aluminosilicate mineral leaving the rest of the elemental composition in a state close to the initial crystalline or amorphous state minus the leached elements. In other words, it may be desirable to selectively leach out only the desired element to create the first salt based on the ratio of amorphous vs. crystalline make-up of the calcium-iron-aluminosilicate mineral. The undissolved portion of the mineral, ideally containing one or more of the alumina, silica and iron oxide or a combination thereof is then separated and used as a pozzolan especially if in an amorphous matrix. Optionally, the undissolved portion of the mineral, ideally containing the alumina, silica and iron oxide can be separated from the first chlorite salt and used in the step three below to combine in with the calcium sulfate or sulfite to manufacture lime, dolomitic lime or hydraulic cement containing calcium oxide, alite and/or belite.

Hyaloclastite $(CaFe_2Al_2Si_2O_8)+H_2SO_4 \rightarrow CaSO_4(s)+AlSO_4(s)+Fe_2O_2+SiO_{2(s)}$; wherein: the first acid is $H_2SO_4$; the first calcium salt is $CaSO_4$; or Hyaloclastite $(CaFe_2Al_2Si_2O_8)+H_2SO_3 \rightarrow CaSO_3(s)+AlSO_4(s)+Fe_2O_2+SiO_{2(s)}$ wherein: first acid is $H_2SO_3$; the first calcium salt is $CaSO_3$; the Step 2 or Phase 2 of the process will be as follows: a thermally treating process, comprising heating the second salt, such as calcium sulfate or sulfite or a combination thereof with a ratio of approximately 1:3 between the two, to form calcium oxide or lime. The desorption of $SO_2$ is a highly endothermic reaction requiring temperatures of above 1100° C. The heating process can be performed in a conventional kiln, a fluid bed, such as a circulating fluid bed, or a vibratory plate microwave oven. The fuel used in a kiln or fluid bed can be a hydrocarbon fuel such as coal, natural gas (methane) or coke. In the case of fuel being a hydrocarbon, the calcium sulfate can be reduced with carbon to partially create calcium sulfite in a ratio of 1:3. This is fed to a simple rotary kiln and burned to produce lime from the hot end and an exhaust gas containing sulfur dioxide.

Firstly, at 500-700° C., the available carbon from the coke reduces about a quarter of the calcium sulfate to calcium sulfide.

$$CaSO_4+2C \rightarrow CaS+2CO_2$$

$$\text{or } CaSO_4+CH_4 \rightarrow CaS+CO_2+2H_2O \quad \text{Equation 1:}$$

Next, at a temperature of 800-1000° C. the rest of the calcium sulfate reacts with the calcium sulfide to produce calcium oxide (lime).

$$3CaSO_4+CaS \rightarrow 4CaO+4SO_2$$

$$\text{or } CaSO_4+H_2O \rightarrow CaO+H_2SO_4 \quad \text{Equation 2:}$$

The lime is then rapidly cooled in the usual manner to preserve the reactive high-temperature minerals. The exhaust gases are de-dusted and cooled by water-washing, further cleaned with mist precipitators, then dried by scrubbing with sulfuric acid. The gas now contains only sulfur dioxide (about 9%), carbon dioxide, a little oxygen and nitrogen+inerts. Air is then admitted to bring the sulfur dioxide to around 6.5%, ensuring a two-fold excess of oxygen for the oxidation.

$$2SO_2+O_2 \rightarrow 2SO_3 \quad \text{Equation 3:}$$

Finally sulfuric acid is formed by reaction with water.

$$SO_3+H_2O \rightarrow H_2SO_4 \quad \text{Equation 4:}$$

The clean dry gases pass through blowers into heat exchangers in which hot product gases are cooled while the input gas is heated to 400-410° C. The gas then enters a catalyst-packed converter. The usual catalyst is doped vanadium pentoxide. The oxidation is exothermic, so in order to prevent temperature from running out of control, heat is exchanged with the cold input gas. Several cycles of heat exchange and conversion take place. The blowers are sized to provide ample draught for the kiln system and to deliver the 200 kPa required to push the gas through the multiple resistant catalyst beds.

The cooled converted gases are finally scrubbed in a counter-flow tower fed with 98% sulfuric acid to produce an oleum, which can be taken as product or diluted with more dilute acid from the drying towers, or with fresh water. The final products are hot and required water cooling to bring them to handleable temperature for storage.

A simplified stoichiometry implies that one mole of calcium sulfate gives rise to one mole of calcium oxide (56.08 g) and one mole of sulfuric acid (98.08 g).

Example 3

A calcium-iron-aluminosilicate mineral within the chemical composition preferably comprises approximately 30 to approximately 57 percent by weight $SiO_2$, approximately 10 to approximately 18 percent by weight $Al_2O_3$, approximately 8 to approximately 18 percent by weight $Fe_2O_3$, and approximately 4 to approximately 25 percent by weight $CaO$ and preferably wherein the sum of the $Al_2O_3+Fe_2O_3$ is between approximately 20 to approximately percent by weight, preferably wherein the ratio between the $Al_2O_3$ and the $Fe_2O_3$ is approximately 0.75 and approximately 1.50 ideally or approximately 1 and the ratio between the $SiO_2$ and the sum of the $Al_2O_3+Fe_2O_3$ is preferably between approximately 1.25 and 2.25 ideally or approximately 1.5 and an amorphous content of approximately 50% and crystalline content of approximately 50% is screened or ground to a volume-based mean particle size of approximately 200 microns.

Step 1 or Phase 1 the calcium-iron-aluminosilicate mineral is combined with a first acid, such as hydrochloric acid, thereby forming a first salt, where the first salt is calcium chloride, aqueous magnesium chlorite and/or the aqueous aluminum chloride from a first solid fraction comprising the solid silica. The time and temperature of the first reaction is controlled so that a portion of the calcium-iron-aluminosilicate mineral will dissolve and another portion of the mineral may not dissolve in the first acid. Alternatively, the calcium oxide from the matrix of the calcium-iron-aluminosilicate mineral may dissolve first either from the amorphous or the crystalline portion of the calcium-iron-aluminosilicate mineral leaving the rest of the elemental composition in a state close to the initial crystalline or amorphous state minus the leached elements. In other words, it may be desirable to selectively leach out only the desired element to create the first salt based on the ratio of amorphous vs. crystalline make-up of the of the calcium-iron-aluminosilicate mineral. The undissolved portion of the mineral, if any, ideally containing the alumina, silica and iron oxide is then separated and used as a pozzolan especially if in an amorphous matrix. Alternatively, one or more of the alumina, silica and/or iron may dissolve into separate compounds or combinations thereof. Optionally, the undissolved portion of the mineral, ideally containing the alumina, silica and iron oxide can be separated from the first chlorite salt and used in step three below to combine with the calcium sulfate or sulfite to manufacture lime, dolomitic lime or hydraulic cement containing calcium oxide, alite and/or belite.

Hyaloclastite $(CaFe_2Al_2Si_2O_8)+8HCl \rightarrow CaCl_{2(aq)}+2AlCl_{3(aq)}+Fe_2O_2+SiO_{2(s)}$, or Hyaloclastite $(CaFe_2Al_2Si_2O_8)+8HCl \rightarrow CaCl_{2(aq)}+Fe_2Al_2SiO_{2(s)}$ Step 2 or Phase 2 comprises reacting the first chlorite salt such as at least the aqueous calcium chloride, optionally the aqueous aluminum chloride, and a second acid such as sulfuric or sulfurous acid to form at least a second salt such as a calcium salt such as solid calcium sulfate or sulfite, aqueous aluminum sulfate or sulfite, and hydrochloric acid.

$CaCl_{2(aq)}+H_2SO_4 \rightarrow CaSO_4(s)$ 2HCl; wherein: the first calcium salt is $CaCl_2$; the first acid is HCl; the second acid is $H_2SO_4$; and the second calcium salt is $CaSO_4$, or $CaCl_{2(aq)}+H_2SO_3 \rightarrow CaSO_3(s)$ 2HCl; wherein: the first calcium salt is $CaCl_2$); the first acid is HCl; the second acid is $H_2SO_3$; and the second calcium salt is $CaSO_3$.

Step 3 or Phase 3 of the process will be as follows: a thermally treating process, comprising heating the second salt, such as calcium sulfate or sulfite or a combination thereof with a ratio of approximately 1:3 between the two, to form calcium oxide. The desorption of $SO_2$ is a highly endothermic reaction requiring temperatures of above 1100° C. (step 3(a)). Optionally, to reduce the temperature of step three above in an optional step 3(b) the calcium sulfate or sulfite or a combination thereof is first mixed with a sufficient amount of alumina, silica and iron oxide in proportions required to make a hydraulic cement containing calcium oxide, and/or alite and/or belite. The source of the alumina, silica and iron oxide can be the undissolved co-product of step one, as described above, or the initial calcium-iron-aluminosilicate mineral in appropriate ratios. The heating process of step 3(b) to desorb $SO_2$ and obtain calcium oxide from calcium sulfate or sulfide decreases to about 900° C. in the presence of the silica, alumina and iron oxide. The heating process of step 3(a) and 3(b) can be performed in a conventional kiln, a fluid bed, such as a circulating fluid bed, or a vibratory plate microwave oven. The fuel used in a kiln or fluid bed can be a hydrocarbon fuel such as coal, natural gas (methane) or coke. In the case of fuel being a hydrocarbon the calcium sulfate can be reduced with carbon to partially create calcium sulfite in a ratio of 1:3. This is fed to a simple rotary kiln and burned to produce clinker from the hot end and an exhaust gas containing sulfur dioxide. Firstly, at 500-700° C., the available carbon from the coke reduces about a quarter of the calcium sulfate to calcium sulfide.

$$CaSO_4+2C \rightarrow CaS+2CO_2 \quad \text{Equation 1:}$$

or $CaSO_4+CH_4 \rightarrow CaS+CO_2+2H_2O$

Next, at a temperature of 800-1000° C. the rest of the calcium sulfate reacts with the sulfide and silica from the alumina, silica and iron oxide mineral from either Step or Phase 1 of the process or from the initial calcium-iron-aluminosilicate mineral, in the presence of low-temperature melts, to produce belite and calcium oxide.

$$3CaSO_4+CaS+2SiO_2 \rightarrow 2Ca_2SiO_4(belite)+4SO_2 \quad \text{Equation 2:}$$

$$3CaSO_4+CaS \rightarrow 4CaO+4SO_2$$

or $CaSO_4+H_2O \rightarrow CaO+H_2SO_4$ Equation 3:

Finally, at temperatures above 1250° C., in the burning zone, most of the free calcium oxide reacts with some of the belite to form alite.

$$Ca_2SiO_4+CaO \rightarrow Ca_3OSiO_4(alite) \quad \text{Equation 4:}$$

The clinker is then rapidly cooled in the usual manner to preserve the reactive high-temperature minerals. The exhaust gases are de-dusted and cooled by water-washing, further cleaned with mist precipitators, then dried by scrubbing with sulfuric acid. The gas now contains only sulfur dioxide (about 9%), carbon dioxide, a little oxygen and nitrogen+inerts. Air is then admitted to bring the sulfur dioxide to around 6.5%, ensuring a two-fold excess of oxygen for the oxidation.

$$2SO_2+O_2 \rightarrow 2SO_3 \quad \text{Equation 5:}$$

Finally sulfuric acid is formed by reaction with water.

$$-SO_3+H_2O \rightarrow H_2SO_4 \quad \text{Equation 6:}$$

The clean dry gases are passed through blowers into heat exchangers in which hot product gases are cooled while the input gas is heated to 400-410° C. The gas then enters a catalyst-packed converter The usual catalyst is doped vanadium pentoxide. The oxidation is exothermic, so in order to prevent the temperature from running out of control, heat is exchanged with the cold input gas. Several cycles of heat exchange and conversion take place. The blowers are sized to provide ample draught for the kiln system and to deliver the 200 kPa required to push the gas through the multiple resistant catalyst beds.

The cooled converted gases are finally scrubbed in a counter-flow tower fed with 98% sulfuric acid to produce an oleum, which can be taken as product or diluted with more dilute acid from the drying towers, or with fresh water. The final products are hot and required water cooling to bring them to handleable temperature for storage.

A simplified stoichiometry implies that one mole of calcium sulfate gives rise to one mole of calcium oxide (56.08 g) and one mole of sulfuric acid (98.08 g), so 86.27 g of a clinker containing 65% CaO can be made. This implies that in an efficient ideal system, sulfuric acid yield should be about 1.14 times that of clinker. In practice, there are losses from both process streams, but more from the multi-stage acid plant, so that acid/clinker ratios actually obtained are in the range of 1.00-1.05.

Example 4

A calcium-iron-aluminosilicate mineral within the chemical composition preferably comprises approximately 30 to approximately 57 percent by weight $SiO_2$, approximately 10 to approximately 18 percent by weight $Al_2O_3$, approximately 8 to approximately 18 percent by weight $Fe_2O_3$, and approximately 4 to approximately 25 percent by weight CaO and preferably wherein the sum of the $Al_2O_3+Fe_2O_3$ is between approximately 20 to approximately percent by weight, preferably wherein the ratio between the $Al_2O_3$ and the $Fe_2O_3$ is approximately 0.75 and approximately 1.50 ideally or approximately 1 and the ratio between the $SiO_2$ and the sum of the $Al_2O_3+Fe_2O_3$ is preferably between approximately 1.25 and 2.25 ideally or approximately 1.5 and an amorphous content of approximately 50% and crystalline content of approximately 50% is ground to a volume-based mean particle size of approximately 100 microns.

Step 1 or Phase 1 the ground calcium-iron-aluminosilicate mineral is combined with a first acid such as sulfuric or sulfurous acid and results in a first salt, where the first salt is sulfate or sulfite such as calcium sulfate or sulfite, magnesium sulfate or sulfite and/or the aluminum sulfate or sulfite and a solid fraction comprising the solid silica. The time and temperature of the first reaction is controlled so that a portion of the calcium-iron-aluminosilicate mineral dissolves and another portion of the mineral does not dissolve in the first acid.

Alternatively, the calcium oxide from the matrix of the calcium-iron-aluminosilicate mineral can dissolve first either from the amorphous or the crystalline portion of the calcium-iron-aluminosilicate mineral leaving the rest of the elemental composition in a state close to the initial crystalline or amorphous state minus the leached elements. In other words, it may be desirable to selectively leach out only the desired element to create the first salt based on the ratio of amorphous vs. crystalline make-up of the calcium-iron-aluminosilicate mineral. The undissolved portion of the mineral, ideally containing the alumina, silica and iron oxide is then separated and used as a pozzolan especially if in an amorphous matrix. Optionally, the undissolved portion of the mineral, ideally containing the alumina, silica and iron oxide can be separated from the first chlorite salt and used in the step three below to combine in with the calcium sulfate or sulfite to manufacture lime, dolomitic lime or hydraulic cement containing calcium oxide, alite and/or belite.

Hyaloclastite $(CaFe_2Al_2Si_2O_8)+H_2SO_4 \to CaSO_4(s)+AlSO_4(s)+Fe_2O_2+SiO_{2(s)}$; wherein: the first acid is $H_2SO_4$; the first calcium salt is $CaSO_4$; or Hyaloclastite $(CaFe_2Al_2Si_2O_8)+H_2SO_3 \to CaSO_3(s)+AlSO_4(s)+Fe_2O_2+SiO_{2(s)}$ wherein: first acid is $H_2SO_3$; the first calcium salt is $CaSO_3$; the Step 2 or Phase 2 of the process will be as follows: a thermally treating process, comprising heating the second salt, such as calcium sulfate or sulfite or a combination thereof with a ratio of 1:3 between the two, to form calcium oxide. The desorption of $SO_2$ is a highly endothermic reaction requiring temperatures of above 1100° C. (step 3(a)). Optionally, to reduce the temperature of step three above an option step 3(b) the calcium sulfate or sulfite or a combination thereof is first mixed with sufficient amount of alumina, silica and iron oxide in proportions required to make a hydraulic cement containing calcium oxide, and/or alite and/or belite. The source of the alumina, silica and iron oxide can be the undissolved co-product of step one as described above or the initial calcium-iron-aluminosilicate mineral in appropriate ratios. The heating process of step 3(b) to desorb $SO_2$ and obtain calcium oxide from calcium sulfate or sulfide decreases to about 900° C. in the presence of the silica, alumina and iron oxide. The heating process of step 3(a) and 3(b) can be performed in a conventional kiln, a fluid bed, such as a circulating fluid bed, or a vibratory plate microwave oven. The fuel used in a kiln or fluid bed can be a hydrocarbon fuel such as coal, natural gas (methane) or coke. In the case of fuel being a hydrocarbon the calcium sulfate can be reduced with carbon to partially create calcium sulfite in a ratio of 1:3. This is fed to a simple rotary kiln and burned to produce clinker from the hot end of the kiln and an exhaust gas containing sulfur dioxide. Firstly, at 500-700° C., the available carbon from the coke reduces about a quarter of the calcium sulfate to calcium sulfide.

$$CaSO_4+2C \to CaS+2CO_2 \qquad \text{Equation 1:}$$

$$\text{or } CaSO_4+CH_4 \to CaS+CO_2+2H_2O$$

Next, at a temperature of 800-1000° C. the rest of the calcium sulfate reacts with the sulfide and silica from the alumina, silica and iron oxide mineral from either Step or Phase 1 of the process or from the initial calcium-iron-aluminosilicate mineral, in the presence of low-temperature melts, to produce belite and calcium oxide.

$$3CaSO_4+CaS+2SiO_2 \to 2Ca_2SiO_4(belite)+4SO_2 \qquad \text{Equation 2:}$$

$$3CaSO_4+CaS \to 4CaO+4SO_2$$

$$\text{or } CaSO_4+H_2O \to CaO+H_2SO_4 \qquad \text{Equation 3:}$$

Finally, at temperatures above 1250° C., in the burning zone, most of the free calcium oxide reacts with some of the belite to form alite.

$$Ca_2SiO_4+CaO \to Ca_3OSiO_4(alite) \qquad \text{Equation 4:}$$

The clinker is then rapidly cooled in the usual manner to preserve the reactive high-temperature minerals. The exhaust gases are de-dusted and cooled by water-washing, further cleaned with mist precipitators, then dried by scrubbing with sulfuric acid. The gas now contains only sulfur dioxide (about 9%), carbon dioxide, a little oxygen and nitrogen+inerts. Air is then admitted to bring the sulfur dioxide to around 6.5%, ensuring a two-fold excess of oxygen for the oxidation.

$$2SO_2+O_2 \to 2SO_3 \qquad \text{Equation 5:}$$

Finally sulfuric acid is formed by reaction with water.

$$SO_3+H_2O \to H_2SO_4 \qquad \text{Equation 6:}$$

The clean dry gases pass through blowers into heat exchangers in which hot product gases are cooled while the input gas is heated to 400-410° C. The gas then enters a catalyst-packed converter. The usual catalyst is doped vanadium pentoxide. The oxidation is exothermic, so in order to prevent temperature from running out of control, heat is exchanged with the cold input gas. Several cycles of heat exchange and conversion take place. The blowers are sized to provide ample draught for the kiln system and to deliver the 200 kPa required to push the gas through the multiple resistant catalyst beds.

The cooled converted gases are finally scrubbed in a counter-flow tower fed with 98% sulfuric acid to produce an oleum, which can be taken as product or diluted with more dilute acid from the drying towers, or with fresh water. The final products are hot and required water cooling to bring them to handleable temperature for storage.

A simplified stoichiometry implies that one mole of calcium sulfate gives rise to one mole of calcium oxide (56.08 g) and one mole of sulfuric acid (98.08 g), so 86.27 g of a clinker containing 65% CaO can be made. This implies that in an efficient ideal system, sulfuric acid yield should be about 1.14 times that of clinker. In practice, there are losses from both process streams, but more from the multi-stage acid plant, so that acid/clinker ratios actually obtained are in the range of 1.00-1.05.

It should be understood, of course, that the foregoing relates only to certain disclosed embodiments of the present invention and that numerous modifications or alterations may be made therein without departing from the spirit and scope of the invention.

What is claimed is:

1. A method comprising:
   combining hyaloclastite with a first acid to form a first salt;
   combining the first salt with a second acid to form a second salt;
   heating the second salt to form an oxide; and
   wherein the hyaloclastite is basaltic hyaloclastite or intermediate basaltic hyaloclastite, wherein the hyaloclastite has a volume-based mean particle size of less than or equal to approximately 500 um, wherein the hyaloclastite is approximately 5% to approximately 95% amorphous and wherein the hyaloclastite is approximately 5% to approximately 95% microcrystalline.

2. The method of claim 1, wherein the first acid is hydrochloric acid and wherein the first salt is $CaCl_2$.

3. The method of claim 2, wherein the second acid is sulfuric acid or sulfurous acid and wherein the second salt comprises $CaSO_4$, $CaSO_3$ or a mixture thereof.

4. The method of claim 3, wherein the oxide comprises CaO, $Ca_2SiO_4$ or a mixture thereof.

5. The method of claim 3, wherein the second salt is heated with carbon or methane to form CaS.

6. The method of claim 1, wherein the hyaloclastite has a volume-based mean particle size of less than or equal to approximately 300 um.

7. The method of claim 1, wherein the hyaloclastite has a volume-based mean particle size of less than or equal to approximately 100 um.

8. The method of claim 4 further comprising using the CaO or $Ca_2SiO_4$ to form a hydraulic cement clinker.

9. The method of claim 1, wherein the hyaloclastite is approximately 15% to 95% amorphous.

10. The method of claim 1, wherein the hyaloclastite is approximately 30% to 95% amorphous.

11. The method of claim 1, wherein the hyaloclastite is approximately 60% to 95% amorphous.

12. A method comprising:
combining hyaloclastite with a first acid to form a first salt;
heating the first salt to form an oxide; and
wherein the hyaloclastite is basaltic hyaloclastite or intermediate basaltic hyaloclastite, wherein the hyaloclastite has a volume-based mean particle size of less than or equal to approximately 500 um, wherein the hyaloclastite is approximately 5% to approximately 95% amorphous and wherein the hyaloclastite is approximately 5% to approximately 95% microcrystalline.

13. The method of claim 12, wherein the first acid is sulfuric acid or sulfurous acid and wherein the first salt comprises $CaSO_4$, $CaSO_3$ or a mixture thereof.

14. The method of claim 12, wherein the oxide comprises CaO.

15. The method of claim 14, wherein the hyaloclastite has a volume-based mean particle size of less than or equal to approximately 300 um.

16. The method of claim 14, wherein the hyaloclastite has a volume-based mean particle size of less than or equal to approximately 100 um.

17. The method of claim 12, wherein the hyaloclastite is approximately 15% to 95% amorphous.

18. The method of claim 12, wherein the hyaloclastite is approximately 30% to 95% amorphous.

19. The method of claim 12, wherein the hyaloclastite is approximately 60% to 95% amorphous.

* * * * *